United States Patent
Zhou

(10) Patent No.: US 10,948,739 B2
(45) Date of Patent: Mar. 16, 2021

(54) DISPLAY DEVICE AND CONTROL METHOD THEREOF

(71) Applicant: BOE Technology Group Co., Ltd., Beijing (CN)

(72) Inventor: Chunmiao Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 218 days.

(21) Appl. No.: 16/123,858

(22) Filed: Sep. 6, 2018

(65) Prior Publication Data
US 2019/0235264 A1    Aug. 1, 2019

(30) Foreign Application Priority Data

Jan. 31, 2018    (CN) .......................... 201810094075.9

(51) Int. Cl.
*G02B 30/25*    (2020.01)
*G02F 1/29*    (2006.01)

(52) U.S. Cl.
CPC .............. *G02B 30/25* (2020.01); *G02F 1/29* (2013.01); *G02F 2001/294* (2013.01)

(58) Field of Classification Search
CPC ...... G02B 30/25; G02F 1/29; G02F 2001/294
USPC .......................................................... 349/15
See application file for complete search history.

(56) References Cited

U.S. PATENT DOCUMENTS

| | | | |
|---|---|---|---|
| 7,787,064 B2 | 8/2010 | Kwon et al. | |
| 8,970,582 B2 | 3/2015 | An et al. | |
| 9,052,537 B1 | 6/2015 | Liao et al. | |
| 9,804,404 B2 | 10/2017 | Lin | |
| 10,495,800 B2 | 12/2019 | Zhou | |
| 2009/0251625 A1 | 10/2009 | Kwon et al. | |
| 2013/0002835 A1 | 1/2013 | Winer | |
| 2013/0057575 A1* | 3/2013 | An ...................... | H04N 13/356 345/619 |

(Continued)

FOREIGN PATENT DOCUMENTS

| CN | 101900890 A | 12/2010 |
|---|---|---|
| CN | 102799024 A | 11/2012 |

(Continued)

OTHER PUBLICATIONS

Office Action issued in Chinese Patent Application No. 201810094075.9, dated Jan. 10, 2020.

*Primary Examiner* — Nathanael R Briggs
*Assistant Examiner* — William D Peterson
(74) *Attorney, Agent, or Firm* — McDermott Will & Emery LLP

(57) ABSTRACT

A display device and a control method of a display device are provided. The display device includes: a display assembly including a plurality of rows of pixel units; a phase retarder; a polarizer; and a visible range adjuster between the display assembly and the polarizer, the visible range adjuster having two electrode layers and a liquid crystal layer divided into at least one first region and at least one second region, and the visible range adjuster is configured to apply a voltage to the first region of the liquid crystal layer through the two electrode layers in response to a first signal, to provide a first visible range for the display device, the first visible range being greater than a second visible range of the display device with the two electrode layers electrically de-energized.

19 Claims, 5 Drawing Sheets

(56) References Cited

U.S. PATENT DOCUMENTS

2015/0138455 A1\* 5/2015 Liao .................. G02B 30/27
 349/15
2016/0033777 A1 2/2016 Lin
2018/0067247 A1 3/2018 Zhou

FOREIGN PATENT DOCUMENTS

| CN | 103002303 A | 3/2013 |
|---|---|---|
| CN | 103698914 A | 4/2014 |
| CN | 105303979 A | 2/2016 |
| CN | 106200130 A | 12/2016 |
| KR | 20090107158 A | 10/2009 |

\* cited by examiner

DISPLAY DEVICE AND CONTROL METHOD THEREOF

CROSS-REFERENCE TO RELATED APPLICATION

This application claims the priority benefit of Chinese Patent Application No. 201810094075.9 filed on Jan. 31, 2018 in the State Intellectual Property Office of China, the disclosure of which is incorporated herein by reference in entirety.

BACKGROUND

Technical Field

Embodiments of the present disclosure relate to the field of display technology, and in particular, to a display device and a control method of a display device.

Description of the Related Art

With the development of information and image display technology, the display technology is increasingly applied in various fields. In some fields, for example, a medical field, high requirements are raised on resolution and visible range for information display.

The conventional display devices are mostly based on ordinary two-dimensional (2D) display images, and the display image lacks a sense of depth and has no stereoscopic effect. Conventional medical three-dimensional (3D) display devices mainly use polarization 3D display technology.

SUMMARY

An embodiment of the present disclosure provides a display device, including: a display assembly including a plurality of rows of pixel units; a phase retarder on a light exit side of the display assembly, the phase retarder being configured to modulate polarized light from adjacent rows of pixel units of the display assembly so that it has different directions of rotation of polarization orientation; a polarizer between the display assembly and the phase retarder; and a visible range adjuster between the display assembly and the polarizer, the visible range adjuster having a first electrode layer, a second electrode layer and a liquid crystal layer, the liquid crystal layer being divided into at least one first region and at least one second region, an orthographic projection of the first region on the display assembly overlapping a portion between the adjacent rows of pixel units, wherein the visible range adjuster is configured to apply a voltage to the first region of the liquid crystal layer through the first electrode layer and the second electrode layer in response to a first signal, to provide a first visible range for the display device, the first visible range being greater than a second visible range of the display device with the first electrode layer and the second electrode layer electrically de-energized.

In some embodiments, the first region is configured such that a polarization orientation of an exit light of the display assembly transmitted through the first region is a first polarization orientation after the voltage is applied to the first region;

the second region is configured such that a polarization orientation of an exit light of the display assembly transmitted through the second region is a second polarization orientation; and the polarizer is configured to transmit the polarized light having the second polarization orientation through the polarizer and to block the polarized light having the first polarization orientation.

In some embodiments, the exit light of the display assembly is the polarized light having a first polarization orientation; the first region is configured to maintain the polarization orientation of the exit light in the first polarization orientation after the voltage is applied to the first region; the second region is configured to change the polarization orientation of the exit light to a second polarization orientation; and the polarizer is configured to transmit the polarized light having the second polarization orientation through the polarizer and to block the polarized light having the first polarization orientation.

In some embodiments, the first polarization orientation is perpendicular to the second polarization orientation.

In some embodiments, the first electrode layer includes a plate-shaped first electrode or a plurality of strip-shaped first electrodes, and the second electrode layer includes a plurality of strip-shaped second electrodes; and at least one of the plurality of strip-shaped second electrodes corresponds to the at least one first region.

In some embodiments, the visible range adjuster is configured such that each first region corresponds to at least three adjacent ones of the second electrodes.

In some embodiments, the portion between the adjacent rows of pixel units on the display assembly is a non-display region; and a width of the first region is greater than or equal to a width of the non-display region.

In some embodiments, the first electrode layer and the second electrode layer are respectively located on two sides of the liquid crystal layer; or the first electrode layer and the second electrode layer are both located on a same side of the liquid crystal layer.

In some embodiments, the phase retarder is a patterned phase retardation film.

In some embodiments, the display device further includes: a polarized glasses detector configured to detect number of pairs of polarized glasses in use.

In some embodiments, the polarized glasses detector is configured to transmit the first signal to the visible range adjuster when the number of the pairs of polarized glasses in use is greater than or equal to 2.

In some embodiments, the polarized glasses detector is configured to transmit a second signal to the visible range adjuster when the number of the pairs of polarized glasses in use is less than or equal to 1, and the visible range adjuster is further configured to stop electrically energizing the first electrode layer and the second electrode layer in response to the second signal.

In some embodiments, the visible range adjuster is configured to increase a width of the first region as the number of the detected pairs of polarized glasses increases.

In some embodiments, the display device further includes a backlight adjuster, wherein the polarized glasses detector is configured to transmit a third signal to the backlight adjuster in response to the number of the pairs of polarized glasses in use being greater than or equal to 1 and to transmit a fourth signal to the backlight adjuster in response to the number of the pairs of polarized glasses in use being equal to 0, and the backlight adjuster is configured to be turned on to increase backlight intensity of the display assembly in response to the third signal and to be turned off in response to the fourth signal.

In some embodiments, the polarized glasses detector is configured to transmit a fifth signal to the phase retarder in response to the number of the pairs of polarized glasses in use being greater than or equal to 1 and to transmit a sixth signal to the phase retarder in response to the number of the pairs of polarized glasses being equal to 0, and the phase retarder is configured to be turned on to modulate the polarized light from adjacent rows of pixel units of the display assembly so that it has different directions of rotation of polarization orientation in response to the fifth signal and configured to be turned off to stop modulating the polarized light in response to the sixth signal.

An embodiment of the present disclosure also provides a control method of the display device as described above, the control method including: detecting number of pairs of polarized glasses in use; and applying a voltage to the first region of the liquid crystal layer through the first electrode layer and the second electrode layer in the visible range adjuster to provide a first visible range for the display device in response to the number of the pairs of polarized glasses in use being greater than or equal to 2.

In some embodiments, the control method further includes: stopping electrically energizing the first electrode layer and the second electrode layer in the visible range adjuster to provide a second visible range for the display device in response to the number of the pairs of polarized glasses in use being less than or equal to 1.

In some embodiments, the control method further includes increasing a width of the first region as the number of the detected pairs of polarized glasses increases.

In some embodiments, the control method further includes: increasing backlight intensity of the display assembly in response to the number of the pairs of polarized glasses in use being greater than or equal to 1.

In some embodiments, the display device includes a backlight adjuster for increasing backlight intensity of the display assembly, the method including: detecting the number of pairs of polarized glasses in use; turning on the visible range adjuster, the phase retarder and the backlight adjuster in response to the number of the pairs of polarized glasses in use being greater than or equal to 2; turning on the phase retarder and the backlight adjuster and turning off the visible range adjuster in response to the number of the pairs of polarized glasses in use being equal to 1; and turning off the visible range adjuster, the phase retarder, and the backlight adjuster in response to the number of the pairs of polarized glasses in use being equal to 0.

BRIEF DESCRIPTION OF THE DRAWINGS

In order to more clearly describe the embodiments of the present disclosure, the drawings for the description of the embodiments will be briefly described below. It should be noted that the accompanying drawings described below merely represent part of the embodiments of the present disclosure, but are not intended to limit the present disclosure. In the drawings.

DETAILED DESCRIPTION OF EMBODIMENTS

In order to make the technical solutions and advantageous of the embodiments of the present disclosure more clearly, the technical solutions of the embodiments of the present disclosure will be clearly and completely described below with reference to the accompanying drawings. It is apparent that the described embodiments are only some of the embodiments of the present disclosure, but not all of them. All other embodiments obtained by those skilled in the art based on the described embodiments of the present disclosure without any creative efforts also fall within the scope of the present disclosure.

Figure 1:
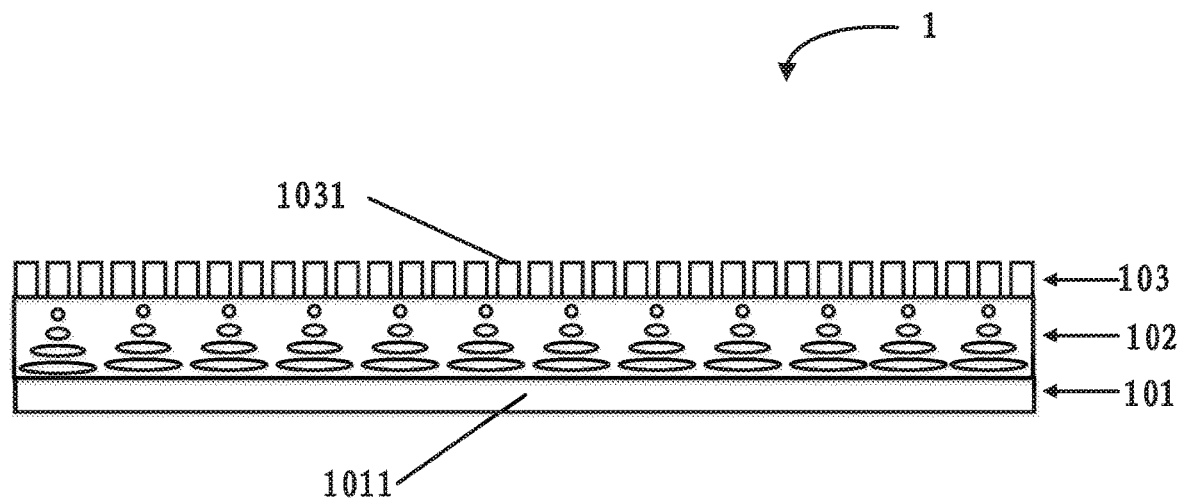
FIG. 1 is a schematic cross-sectional view of a visible range adjuster in a display device according to an embodiment of the present disclosure.

FIG. 1 is a schematic cross-sectional view of a visible range adjuster in a display device according to an embodiment of the present disclosure.

As shown in FIG. 1, an embodiment of the present disclosure provides a visible range adjuster 1. The visible range adjuster 1 includes a first electrode layer 101, a liquid crystal layer 102, and a second electrode layer 103. The liquid crystal layer 102 is located between the first electrode layer 101 and the second electrode layer 103. The first electrode layer 101 includes a first electrode 1011 (for example, a plate-shaped electrode), and the second electrode layer 103 includes a plurality of strip-shaped second electrodes 1031 (for example, the plurality of second electrodes are arranged in parallel).

The first electrode 1011 and the second electrodes 1031 may be partially or entirely made of a transparent material. For example, they may be made of a transparent conductive material, such as indium tin oxide (ITO).

The plurality of second electrodes 1031 may be selectively applied with a voltage. Accordingly, the first electrode layer 101 may include a plurality of strip-shaped first electrodes 1011 arranged in parallel, so as to apply a voltage in correspondence with the plurality of second electrodes 1031 of the second electrode layer 103, increasing control flexibility. In addition, in order to reduce the number of manufacturing processes, the first electrode layer 101 may include only a plate-shaped first electrode 1011 to be applied with a common voltage as a whole.

Liquid crystal molecules in the liquid crystal layer 102 change their alignment direction under the action of an electric field between the first electrode 1011 and the second electrodes 1031, thereby affecting a polarization orientation of light transmitted through the liquid crystal layer. The visible range adjuster 1 can easily realize a controllable liquid crystal grating.

Figure 8:
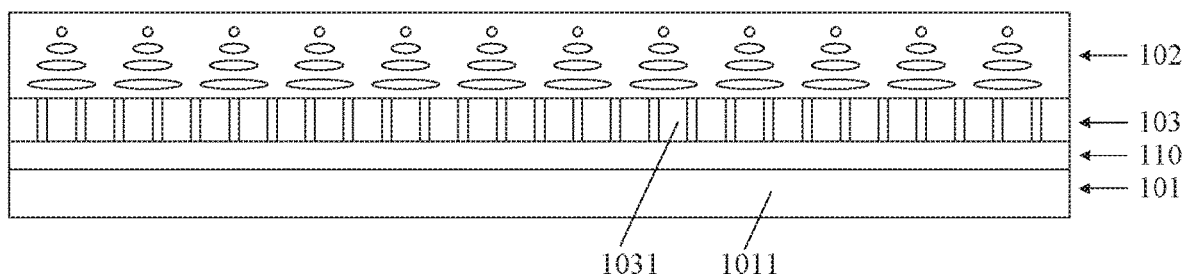
FIG. 8 is a schematic cross-sectional view of a visible range adjuster in a display device according to another embodiment of the present disclosure.

As shown in FIG. 1, the first electrode 1011 and the second electrodes 1031 are disposed on both sides of the liquid crystal layer 102, respectively. In this case, an electric field perpendicular to the liquid crystal layer 102 is formed to control alignment of the liquid crystal molecules in the liquid crystal layer 102. However, it should be understood that the present disclosure is not limited to such an arrangement. For example, as shown in FIG. 8, the first electrode 1011 and the second electrodes 1031 may also be disposed on the same side of the liquid crystal layer 102 to use an electric field parallel to the liquid crystal layer 102 to control the alignment of the liquid crystal molecules in the liquid crystal layer 102. In the example of FIG. 8, the first electrode 1011 and the second electrodes 1031 may be separated by an insulating layer 110 between the first electrode layer 101 and the second electrode layer 103.

As shown in FIG. 1, in the liquid crystal layer 102, the liquid crystal molecules at a position where an electric field is not formed maintain their alignment in an initial state. The alignment of the liquid crystal molecules in this initial state causes a change in the polarization orientation of the light transmitted through the liquid crystal layer. For example, the alignment in this initial state may be in a form in which long-axis directions of liquid crystal molecules arranged along a direction of light propagation are deflected sequentially and there is a certain angle between the long-axis directions of adjacent liquid crystal molecules (torsion). Thus, as the light is transmitted through the liquid crystal molecules, the polarization orientation gradually changes. While at a position where the electric field is formed, the alignment of the liquid crystal molecules is changed to reduce degree of change in the polarization orientation of the light. By selecting intensity of the voltage, alignment direction of the liquid crystal molecules can be exactly same, so that the polarization orientation of the transmitted light can be completely maintained.

However, it should be understood that such an arrangement is not a limitation to the present disclosure. Conversely, in the initial state, the liquid crystal molecules may also have the same alignment direction, thereby maintaining the polarization orientation of the transmitted light. After the electric field is applied, the liquid crystal molecules are twisted to change the polarization orientation of the transmitted light.

Figure 2:
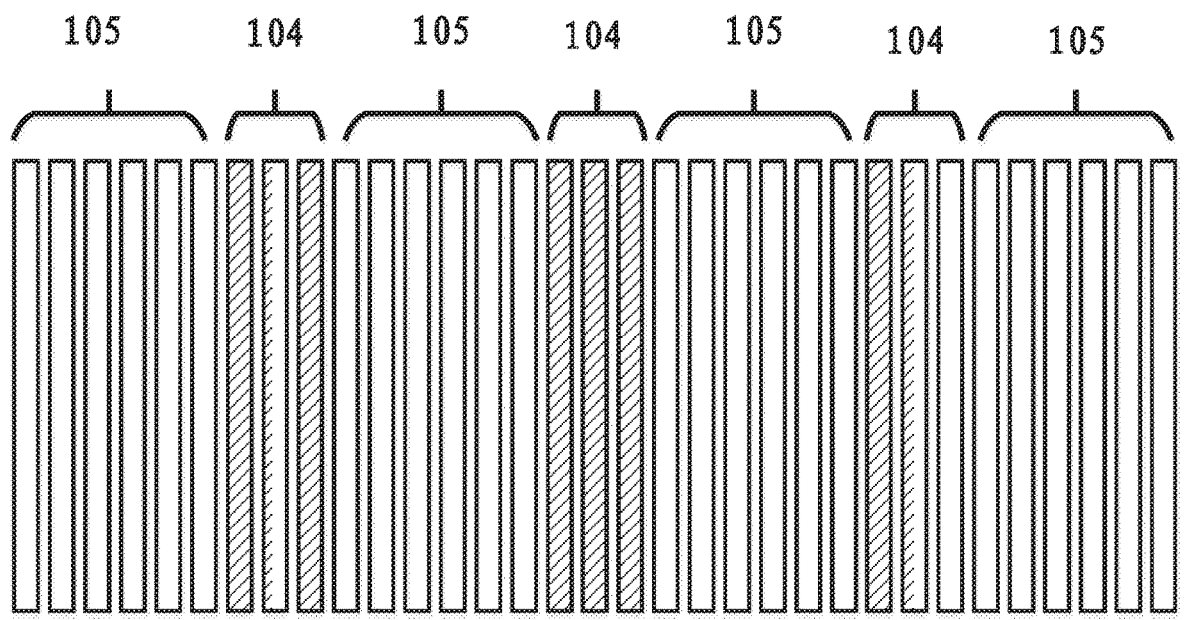
FIG. 2 is a schematic top view of the visible range adjuster of FIG. 1.

FIG. 2 is a schematic top view of the visible range adjuster of FIG. 1.

As shown in FIG. 2, in an activated state of the visible range adjuster 1, at least one of the plurality of second electrodes 1031 is applied with a voltage such that the liquid crystal layer 102 includes at least one first region 104 and at least one second region 105. That is, at least one of the plurality of second electrodes 1031 corresponds to at least one first region 104. The at least one first region 104 may be used to maintain the polarization orientation of the transmitted light, and the at least one second region 105 may be used to change the polarization orientation of the transmitted light. An orthographic projection of the first region 104 on the display assembly 301 may overlap a portion between adjacent rows of pixel units. In other words, the first region 104 corresponds to a portion between adjacent rows of pixel units of the display assembly 301.

As shown in FIG. 2, as an example, the first region 104 corresponds to the second electrodes 1031 to which a voltage is applied (as shown by shadow areas in FIG. 2). That is, the alignment of the liquid crystal molecules of the first region 104 is changed by applying the electric field to maintain the polarization orientation of the transmitted light.

In the embodiments of the present disclosure, the number of the second electrodes 1031 corresponding to one first region 104 is not limited. As an example, one first region 104 may correspond to at least three adjacent second electrodes 1031 to improve the stability of the electric field, and the second electrodes 1031 may backup each other to prevent damage.

Figure 3:
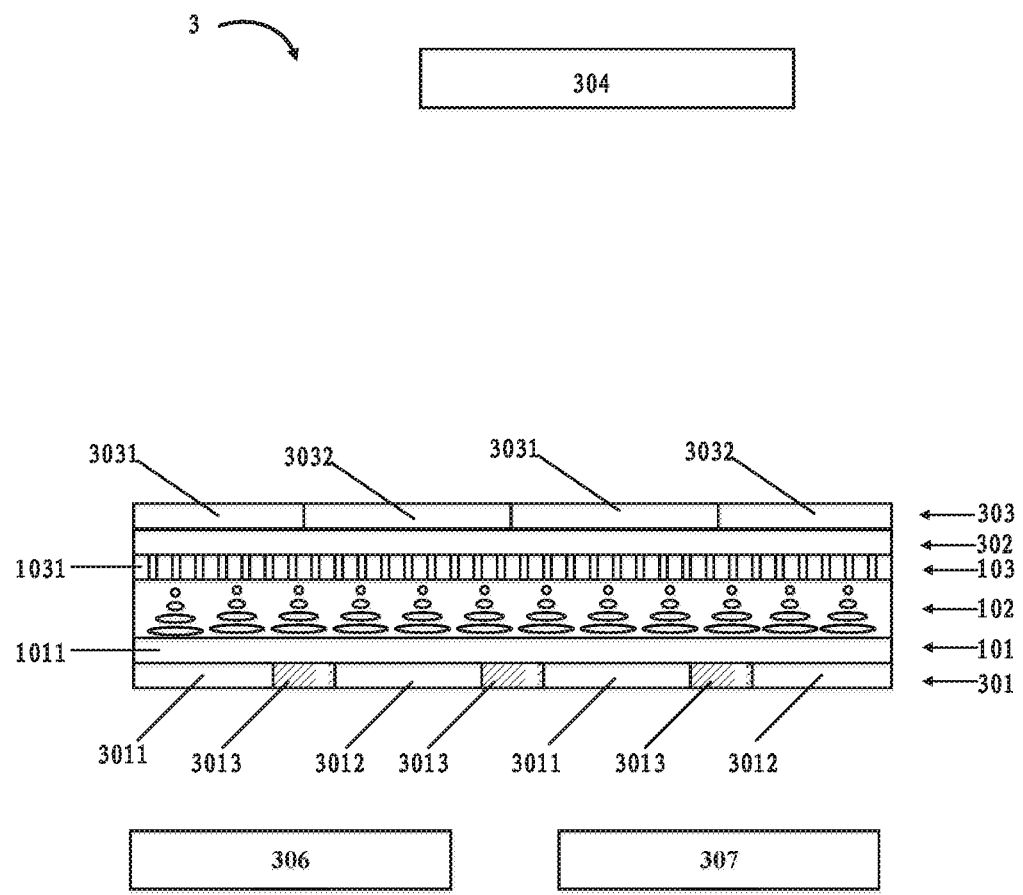
FIG. 3 is a schematic view of a display device according to an embodiment of the present disclosure.

FIG. 3 is a schematic view of a display device according to an embodiment of the present disclosure.

The embodiment of the present disclosure also provides a display device 3. The display device 3 includes a display assembly 301, the visible range adjuster 1 as described above, a polarizer 302 (for example a linear polarizer), and a phase retarder 303. The visible range adjuster 1, the polarizer 302 and the phase retarder 303 are sequentially disposed along a direction of an exit light of the display assembly 301. The visible range adjuster 1, the polarizer 302 and the phase retarder 303 are all located on a light exit side of the display assembly 301. The polarizer 302 is located between the display assembly 301 and the phase retarder 303. The visible range adjuster 1 is located between the display assembly 301 and the polarizer 302. The display assembly 301 may be a liquid crystal display (LCD) assembly and the exit light is a polarized light. The display assembly 301 may also be other display assemblies which are additionally provided with a polarizer to emit a polarized light, for example, an organic light emitting diode (OLED) display assembly provided with a polarizer may be used. The polarizer 302 may be configured to block the polarized light having a first polarization orientation and transmit the polarized light having a second polarization orientation therethrough. The phase retarder 303 is configured to modulate the polarized light from adjacent rows of pixel units of the display assembly 301 so that it has different directions of rotation, for example, it modulates the polarized light from a first row of pixel units of the display assembly 301 to form left-handed polarized light and modulates the polarized light from a second row of pixel units of the display assembly 301 to form right-handed polarized light, and the first row of pixel units and the second row of pixel units are adjacent to each other. The visible range adjuster 1 may be used to increase visible range of the display device. For example, the visible range adjuster 1 may be configured to apply a voltage to the first region 104 of the liquid crystal layer 102 through the first electrode layer 101 and the second electrode layer 103 in response to a first signal to provide a first visible range for the display device, and the first visible range is greater than a second visible range of the display device in a case where the first electrode layer 101 and the second electrode layer 102 are not electrically energized. The first signal may be an actuation signal of the visible range adjuster 1, for example, it may be generated by other components in the display device or artificially given.

As an example, the phase retarder 303 may be a patterned phase retardation film and the pattern cannot be changed. Such a fixed pattern is always in an on state, and may be easily applied to a 3D display. When a 2D display is performed, the user directly views without 3D glasses. Since the polarized light is not shielded by the 3D glasses, the polarized light having different directions of rotation of polarization orientation after being transmitted through the phase retarder 303 may still be viewed by the user, and therefore it does not have an adverse effect on viewing.

When performing a 3D display, adjacent rows of pixel units of the display assembly 301 are assigned as a row of left-eye-image pixels 3011 for displaying a left eye image and a row of right-eye-image pixels 3012 for displaying a right eye image. Correspondingly, a left eye pattern 3031 of the patterned phase retardation film corresponds to the row of left-eye-image pixels 3011, and a right eye pattern 3032 corresponds to the row of right-eye-image pixels 3012. The left eye pattern 3031 causes the polarized light from the row of left-eye-image pixels 3011 to have a first direction of rotation of polarization orientation, such as left-handed direction. The right eye pattern 3032 causes the polarized light from the row of right-eye-image pixels 3012 to have a second direction of rotation of polarization orientation, such as right-handed direction.

The user wears polarized glasses 304 for viewing. The left and right spectacle lenses of the polarized glasses 304 are only capable of allowing the polarized light with a specific direction of rotation of polarization orientation to transmit therethrough, while blocking the polarized light with other directions of rotation of polarization orientation. For example, the left spectacle lens allows the left-handed polarized light to transmit therethrough and the right spectacle lens allows the right-handed polarized light to transmit therethrough. Thus, the light from the row of left-eye-image pixels 3011 passes through the left eye pattern 3031, and then passes through the left spectacle lens of the polarized glasses 304, and then is received by the user's left eye. The light from the row of right-eye-image pixels 3012 passes through the right eye pattern 3032, and then passes through the right spectacle lens of the polarized glasses 304, and then is received by the user's right eye. In this way, the user can perceive the 3D image.

In the state of FIG. 3, the visible range adjuster 1 is in an off state, and the liquid crystal molecules in the liquid crystal layer 102 maintain their alignment in the initial state. The alignment in this initial state causes a change in the polarization orientation of the transmitted light, that is, it changes the polarization orientation of the transmitted light from the first polarization orientation to the second polarization orientation. Therefore, all of the exit light from the display assembly 301 may be emitted through the polarizer 302. The visible range adjuster 1 is entirely transparent and does not affect the display effect and the exit path of the display assembly 301. As an example, the first polarization orientation and the second polarization orientation may be perpendicular to each other.

It should be noted that different types of liquid crystal members may have different alignment modes under the action of an electric field. The embodiment shown in FIG. 3 only takes one type of liquid crystal members as an example. For other types of liquid crystal members, it just needs to adjust the distribution of the electric field according to properties of the liquid crystal, which will not be described herein.

Referring to FIG. 3, in an embodiment of the present disclosure, the display device further includes a polarized glasses detector 306. The polarized glasses detector 306 is configured to detect state of use of the polarized glasses 304 and the number of pairs of polarized glasses 304 in use. The detection result may be used to determine whether it is in a 3D mode and what number of people that are watching the display device. The communication between the polarized glasses detector 306 and the polarized glasses 304 may adopt any technical means, for example, infrared, Bluetooth, wireless network, or the like.

As an example, the polarized glasses detector 306 is configured to transmit a first signal to the visible range adjuster 1 when the number of the pairs of polarized glasses in use is greater than or equal to 2. Further, the polarized glasses detector 306 is configured to transmit a second signal to the visible range adjuster 1 when the number of the pairs of polarized glasses in use is less than or equal to 1. The number of the pairs of polarized glasses in use is less than or equal to 1, and it means that at most one person is watching the 3D display. Since a relatively small visible range is enough to only one person watching the 3D display, the visible range adjuster 1 may be further configured to stop electrically energizing the first electrode layer 101 and the second electrode layer 103 in response to the second signal, so as to save energy.

In an embodiment of the present disclosure, as another example, the phase retarder 303 may also adopt a controllable film or a plate structure. In contrast to the patterned phase retardation film that is always in operation, when a voltage is applied to the controllable film or the plate structure so that it is in an activated state, the state of medium forming the film or plate is changed, thereby forming the left eye pattern and the right eye pattern. When voltage is not applied, it does not affect the direction of rotation of the polarization orientation of the transmitted light. In this case, the phase retarder 303 may be further configured to be in an activated state in response to the number of the pairs of polarized glasses in use detected by the polarized glasses detector 306 being greater than or equal to 1, to match the display of 3D mode.

In an embodiment of the present disclosure, the display device 3 further includes a backlight adjuster 307. The backlight adjuster 307 may be configured to increase backlight intensity of the display assembly 301 in the 3D display mode. The polarized glasses detector 306 may be configured to transmit a third signal to the backlight adjuster 307 when the number of the pairs of polarized glasses in use is greater than or equal to 1, and the backlight adjuster 307 may be configured to increase the backlight intensity of the display assembly 301 in response to the third signal. When the 3D display is performed, the light entering the user's glasses is reduced due to the shielding of the polarized glasses 304, and therefore the image will be darkened. Increasing the backlight intensity may prevent the image from being darkened. In addition, after the visible range adjuster 1 is turned on, it is also possible to shield a part of the light, and thus increasing the backlight intensity may avoid affection of the visible range adjuster 1 on brightness of the image. The adjustment of the backlight may be performed according to a pre-stored strategy. For example, once it is determined that the 3D mode is performed, the brightness may be increased to a multiple of the brightness in the 2D display mode, for example, 1.5 times or 2 times and so on. The polarized glasses detector 306 may also be configured to transmit a fourth signal to the backlight adjuster 307 when the number of the pairs of polarized glasses in use is equal to 0, and the backlight adjuster 307 may be configured to be turned off in response to the fourth signal.

The polarized glasses detector 306 may be used to automatically determine the viewing mode and the number of the users. However, this is not a limitation to the present disclosure. The user may also directly set the viewing mode and the number of the users.

Figure 4:
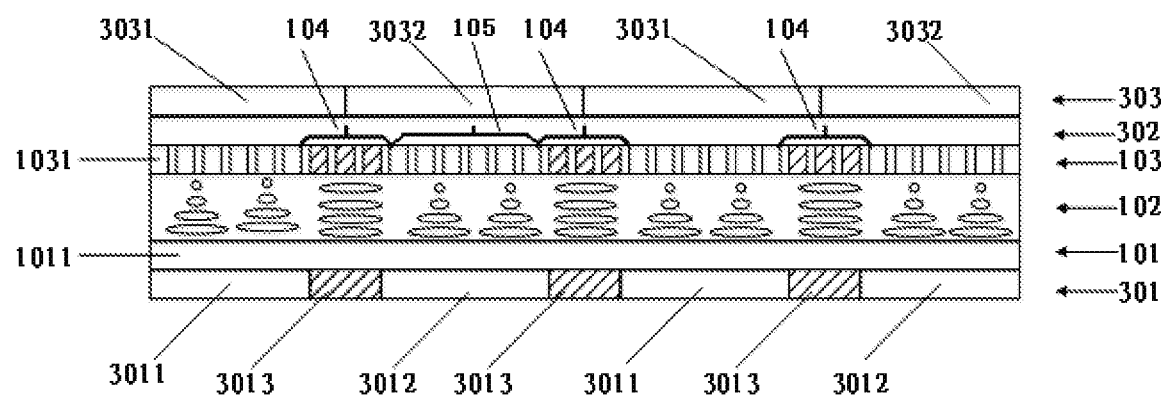
FIG. 4 is a schematic view of the display device of FIG. 3 with a visible range adjuster in an activated state.

FIG. 4 is a schematic view of the display device of FIG. 3 with the visible range adjuster in the activated state.

As shown in FIG. 4, in an embodiment of the present disclosure, the visible range adjuster 1 is turned on when viewing the display of 3D mode, especially when viewed by multiple people. The first region 104 corresponds to a position between the adjacent rows of pixel units of the display assembly 301, so as to adjust the visible range. The position between the adjacent rows of pixel units refers to a non-display region.

In an embodiment of the present disclosure, in the case where the polarized glasses detector 306 is used, the visible range adjuster 1 may be configured to be in an activated state in response to the number of the pairs of polarized glasses in use detected by the polarized glasses detector 306 being greater than or equal to 1, especially greater than or equal to 2.

In FIG. 4, the exit light of display assembly 301 is the polarized light having the first polarization orientation. The polarizer 302 is configured to transmit the polarized light having the second polarization orientation therethrough and block the polarized light having the first polarization orientation. After the visible range adjuster 1 is turned on, the first region 104 maintains the polarization orientation of the exit light in the first polarization orientation. The second region 105 is configured to change the polarization orientation of the exit light to the second polarization orientation. The light in the range of the first region 104 cannot be transmitted through the polarizer 302. This allows the user to adjust the visible range.

Figure 5:
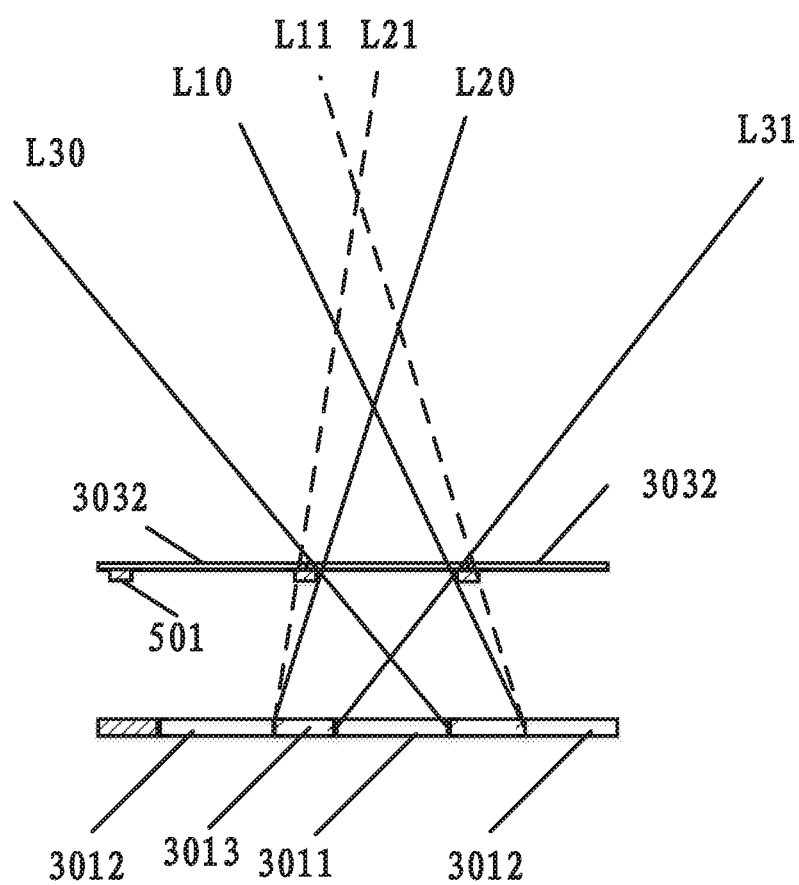
FIG. 5 is a schematic view of an optical path of a display device.

FIG. 5 is a schematic view of an optical path of the display device. In FIG. 5, the shielding effect of the visible range adjuster 1 and the polarizer 302 on the light in the state of FIG. 4 is equivalent to a shielding region 501 for more concise description.

Theoretically, the light from the row of left-eye-image pixels 3011 has a right-handed direction after passing through the right eye pattern 3032, therefore it cannot pass through the left spectacle lens. Similarly, the light from the row of right-eye-image pixels 3012 has a left-handed direction after passing through the left eye pattern 3031, therefore it cannot pass through the right spectacle lens. However, there are actually various unavoidable defects. For example, a boundary between the left eye pattern 3031 and the right eye pattern 3032 is not clear due to the processing process, and the polarizer in the polarizing glasses 304 cannot completely block the light which is undesired to be transmitted therethrough, and so on. These defects cause the light passing through the boundary between the left eye pattern 3031 and the right eye pattern 3032 to interfere with each other (such interference is also referred to as crosstalk), affecting the actual viewing range.

As shown in FIG. 5, without considering the affection of the shielding region 501, a range is shown with lines L10, L11 as boundaries. In this range, the light from one of the row of right-eye-image pixels 3012 passes through the boundary between the left eye pattern 3031 and the right eye pattern 3032, causing the crosstalk and thereby affecting the viewing effect. Similarly, another range is shown with lines L20, L21 as boundaries. In this range, the light from another one of the row of right-eye-image pixels 3012 passes through the boundary between the left eye pattern 3031 and the right eye pattern 3032, causing the crosstalk. The lines L11, L21 serve as the boundaries to define a first viewing range, in which a better viewing may be performed. When detecting a specific product, as a specific example, an included angle between the lines L11, L21 representing the first viewing range is approximately 25°. In consideration of the affection of the shielding region 501, the light between the lines L10, L11 and light between the lines L20, L21 which are unfavorable for viewing are blocked. At the same time, the shielding region 501 does not affect the propagation of normal light from the row of right-eye-image pixels 3012 on both sides. Therefore, between the lines L10, L11, and between the lines L20, L21, the light from the row of right-eye-image pixels 3012 on both sides may be satisfactorily viewed normally. In addition, lines L30, L31 are used as boundaries to indicate a range in which the corresponding row of left-eye-image pixels 3011 may be satisfactorily viewed. Finally, an included angle between the lines L10, L20 representing the second viewing range 308 is approximately 32° greater than the first viewing range 305. The visible range of display assembly 301 is significantly expanded.

It should be noted that the embodiments of the present disclosure are not limited to the case where the exit light of the display assembly 301 is the polarized light having the first polarization orientation, as long as the first region 104 may be configured such that the polarization orientation of the exit light of the display assembly transmitted through the first region 104 is in the first polarization orientation after the first region is applied with a voltage, and the second region 105 may be configured such that the polarization orientation of the exit light of the display assembly transmitted through the second region 105 is in the second polarization orientation. It can achieve the effect of expanding the visible angle.

In an embodiment of the present disclosure, a portion between the adjacent rows of pixels 3011 and 3012 of the display assembly 301 may be provided with a black matrix 3013 or a non-display structure such as a pixel defining layer. As an example, a width of the first region 104 may be greater than or equal to a width of the non-display region between the adjacent rows of pixels 3011 and 3012, for example greater than a width of the black matrix 3013, to effectively prevent crosstalk.

In an embodiment of the present disclosure, as the number of viewers increases, the width of the first region 104 may also be increased to further prevent crosstalk, to further expand the visible range to some extent. In the example of FIG. 4, the number of the second electrodes 1031 to which a voltage is applied may be increased, thereby increasing the width of the first region 104. For example, the first region 104 may correspond to five adjacent second electrodes 1031 to which a voltage is applied. According to such a configuration, crosstalk may be further prevented, thereby obtaining a larger visible range.

It should be understood that, according to other embodiments which are not shown, the first region 104 may also be a position corresponding to rows of pixels of the display assembly 301. At this time, the exit light of the display assembly 301 is the polarized light having the first polarization orientation. At least one second region is configured to change the polarization orientation of the exit light to the second polarization orientation. The polarizer is configured to transmit the polarized light having the first polarization orientation therethrough and to block the polarized light having the second polarization orientation. Such a scheme may also effectively prevent crosstalk and expand the visible range. That is, depending on the different arrangement manners of the polarizer 302, the visible range adjuster 1 may be configured such that: in the activated state, any one of the first region 104 and the second region 105 corresponds to the portion between the adjacent rows of pixels of the display assembly 301. Accordingly, the visible range adjuster 1 may also be configured to increase the width of one of the first region 104 and the second region 105 corresponding to the portion between the adjacent rows of pixels of the display assembly 301 as the number of the detected pairs of polarized glasses 304 increases.

In an embodiment of the present disclosure, according to FIGS. 1-4, it is shown that the second electrodes 1031 are disposed throughout the second electrode layer 103. In such a case, the second electrode 1031 at any position may be flexibly controlled such that the first region may correspond to the position between the rows of pixels of the display assembly or the position of the row of pixels of the display assembly. In addition, the width of the first region may also be flexibly adjusted, that is, such a visible range adjuster 1 may be matched with different display assemblies, as well as polarizers.

It should be understood that any other number or arrangement of second electrodes 1031 may be employed. For example, in the second electrode layer 103, the second electrodes 1031 are not entirely disposed, and only the second electrodes 1031 corresponding to the position of the first region 104 is retained, to reduce the number of electrodes, simplify control process, and save costs.

As an example, the polarized glasses detector 306 may be configured to transmit a fifth signal to the phase retarder 303 in response to the number of the pairs of polarized glasses in use being greater than or equal to 1 and to transmit a sixth signal to the phase retarder 303 in response to the number of the pairs of polarized glasses being equal to 0, and the phase retarder 303 is configured to be activated to modulate the polarized light from adjacent rows of pixel units of the display assembly 301 so that it has different directions of rotation of polarization orientation in response to the fifth signal and to be turned off to stop modulating the polarized light in response to the sixth signal. In this case, the phase retarder 303 is also actively controllable and may be turned on or off depending on whether or not a 3D display is required.

According to an embodiment of the present disclosure, the display assembly 301 may be any type of known display assemblies, such as a twisted nematic (TN) liquid crystal panel, an in-plane switching (IPS) liquid crystal panel, an OLED panel having a polarizer, or the like. When a 3D display is viewed especially by multiple people, the visible range adjuster 1 may form a grating to prevent crosstalk, to expand the visible range of the display assembly 301. When a 2D display is viewed, the visible range adjuster 1 may allow the light as a whole to transmit therethrough, without affecting the display effect. According to such a scheme, the 3D display effect may be improved without changing hardware configuration inside the display assembly 301, and the 2D display is compatible with the 3D display, and therefore it may be applied to upgrade the existing 2D display products.

Figure 6:
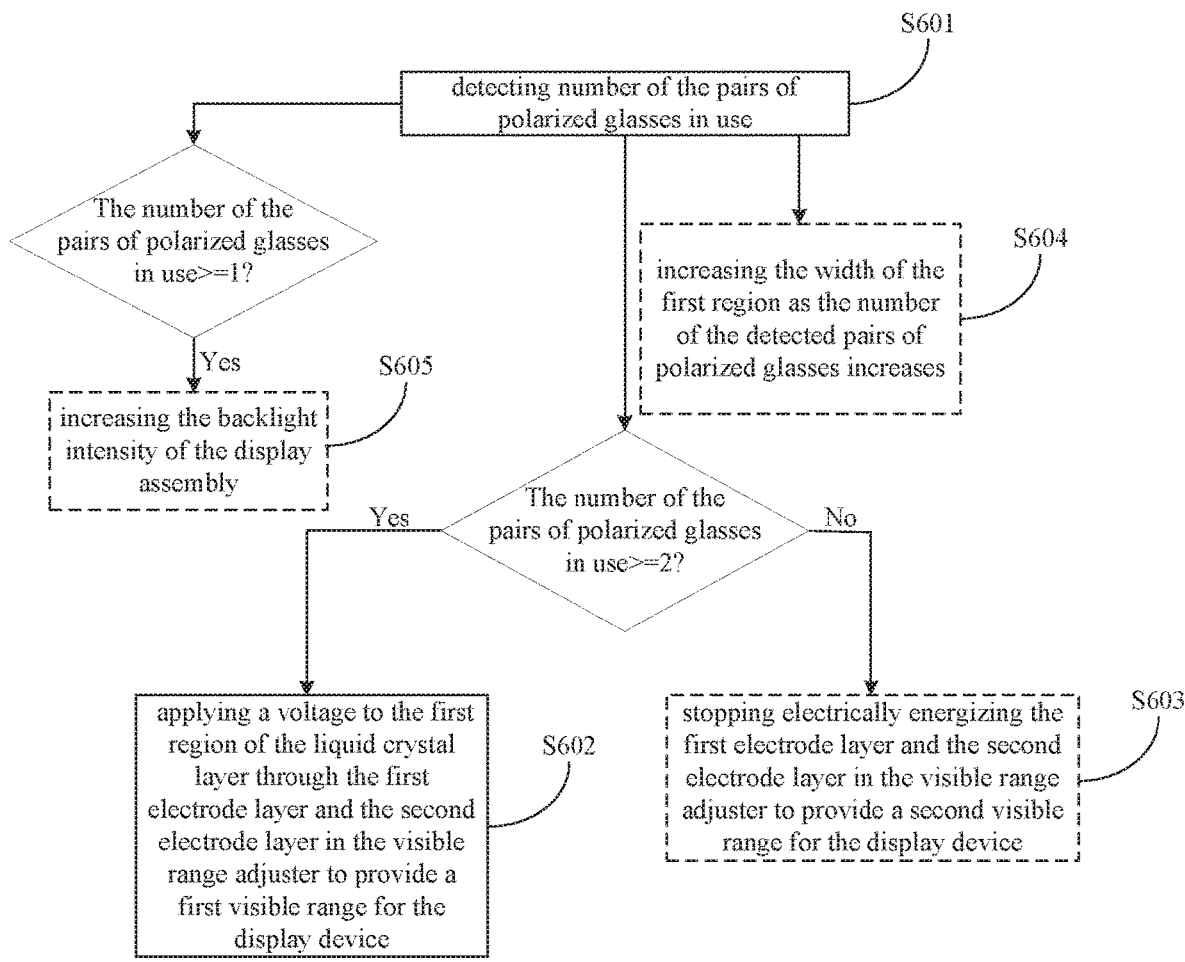
FIG. 6 is a schematic flow chart of a control method of the display device of FIG. 3.

FIG. 6 is a schematic flow chart of a control method of the display device of FIG. 3.

As shown in FIG. 6, the control method of the display device 3 includes:

Step S601: detecting the number of the pairs of polarized glasses in use (for example, by detecting the state of use of the polarized glasses); Step S602: applying a voltage to the first region of the liquid crystal layer through the first electrode layer and the second electrode layer in the visible range adjuster to provide a first visible range for the display device when the number of the pairs of polarized glasses in use is greater than or equal to 2.

As an example, the above control method may further include: Step S603: stopping electrically energizing the first electrode layer and the second electrode layer in the visible range adjuster to provide a second visible range for the display device when the number of the pairs of polarized glasses in use is less than or equal to 1. The second visible range is less than the first visible range.

When the number of the pairs of polarized glasses in use is greater than or equal to 2, it means that multiple people are simultaneously viewing the 3D display image of the display assembly. The above method increases the visible range of the display device by activating the visible range adjuster in order to meet the requirements of multi-person viewing. When the number of the pairs of polarized glasses in use is less than or equal to 1, it means that only one person is viewing the 3D display image of the display assembly or the display assembly is displaying a 2D image. At this time, a smaller visible range of the display device can satisfy the viewing requirements, therefore it can stop electrically energizing the first electrode layer and the second electrode layer in the visible range adjuster, to save energy.

As an example, the control method may further include Step S604: increasing the width of the first region as the number of the detected pairs of polarized glasses increases.

In order to meet the requirements for the 3D mode display, the control method may further include Step S605: increasing the backlight intensity of the display assembly when the number of the pairs of polarized glasses in use is greater than or equal to 1. This may compensate for the loss of light energy due to the polarized glasses.

In the above embodiments, a multi-person 3D mode display, a single-person 3D mode display, and a 2D mode display may be determined by detecting the number of the pairs of polarized glasses in use. However, the present disclosure is not limited thereto, for example, the display mode may be determined by manually setting or pre-storing information.

In the case where the display device 3 includes the polarized glasses detector 306, when it is detected that at least one pair of polarizing glasses 304 is in use, it is determined that the display assembly 301 is displaying in a 3D mode. The number of the pairs of polarized glasses 304 in use may be determined as the number of viewers. Based on the detection to the polarized glasses 304, when the polarized glasses 304 are used by a user, the display device 3 performs display in a 3D mode, and when the polarized glasses 304 are not used by the user, the display device 3 may be actively and immediately switched to the 2D mode display.

Figure 7:
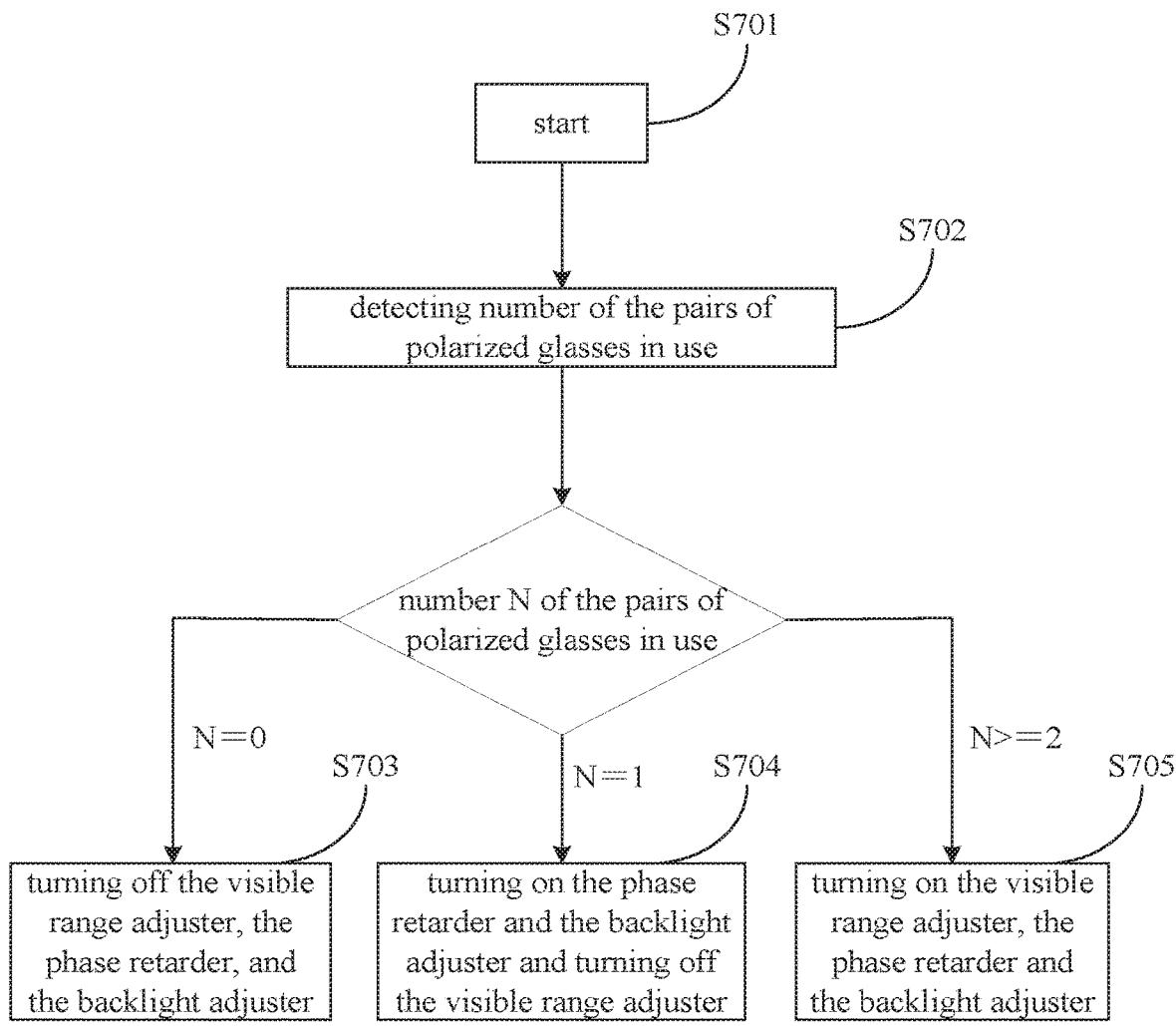
FIG. 7 is a schematic flow chart of another control method of the display device of FIG. 3.

FIG. 7 is a schematic flow chart of another control method of the display device of FIG. 3. FIG. 7 shows the above processes in more detail.

In Step S701, the use of the display device 3 is started. In Step S702, the number N of the pairs of polarized glasses in use is detected (for example, by detecting the state of use of the polarized glasses) and is determined as the number of viewers. When N=0, it is determined that there is no demand for the 3D mode display, and the process proceeds to Step S703. When N=1, it is determined that there is one user who needs to view display content of 3D mode, and the process proceeds to Step S704. When N≥2, it is determined that there are a plurality of users who need to view the display content of 3D mode, and the process proceeds to Step S705.

In Step S703, the display assembly 301 receives a single channel signal and performs a 2D mode display. The visible range adjuster 1 is turned off and it is transparent as a whole, so that it does not affect the 2D display effect. The phase retarder 303 is turned off and it does not change the direction of rotation of the polarization orientation of the polarized light. The backlight adjuster 307 may also be turned off.

It should be understood that, in the case a phase retarder whose pattern is not adjustable is used, even if the direction of rotation of the polarization orientation of the polarized light is changed, it will affect the display effect since 3D glasses are not used.

In Step S704, the display assembly 301 receives a dual-channel signal and performs a 3D mode display. The visible range adjuster 1 is turned off and it does not change the visible angle. The phase retarder 303 is turned on to support display in the 3D mode.

The dual-channel signal may be signals for forming a left eye pattern and a right eye pattern, respectively. The single channel signal may be a single, undivided signal representing overall pattern.

In general, when one user views images on the display device, the visible range which is not adjusted may also meet the viewing needs. Alternatively, the visible range adjuster 1 may also be turned on to provide a larger visible range.

Additionally, the backlight adjuster 307 may also be turned on to increase the backlight intensity of display assembly 301.

In Step S705, the display assembly 301 receives a dual-channel signal and performs a 3D mode display. The visible range adjuster 1 is turned on to provide a larger visible range. The phase retarder 303 is turned on to support display in the 3D mode. Additionally, the backlight adjuster 307 may also be turned on to increase the backlight intensity of display assembly 301.

According to an embodiment of the present disclosure, the display mode and the number of viewers may be determined by the display device. When a 3D display is viewed in particular by multiple people, the visible range adjuster 1 may form a grating to prevent crosstalk, to expand the visible range of the display assembly 301. When a 2D display is viewed, the visible range adjuster 1 may be turned off and allow the light to transmit through the entire display assembly, without affecting the display effect. The display device according to the present disclosure may intelligently perform switching between 2D display picture and 3D display picture actively according to the requirements of the viewer, and may perform the adjustment of 3D display viewing angle and brightness according to the number of viewers, thereby achieving a single-person viewing or a multi-person simultaneous viewing in different scenes while improving the display effect, saving energy consumption and reducing cost. The embodiments of the present disclosure are applicable to on-the-spot teaching, observation and the like, for example, surgical demonstration teaching, surgical guidance, surgical observation, training and demonstration related to operation of medical apparatus and instruments, and the like.

In addition, according to such a scheme, the 3D display effect may be improved without changing hardware configuration inside the display assembly 301, and such solution is compatible with both the 2D display and the 3D display, and therefore it may be applied to upgrade the existing 2D display products.

It is to be understood that the above embodiments are merely exemplary embodiments for describing the principles of the present disclosure, but the present disclosure is not limited thereto. Various modifications and improvements may be made by those skilled in the art without departing from the spirit and scope of the present disclosure, and such modifications and improvements also fall within the scope of the present disclosure.

What is claimed is:

1. A display device, comprising:
a display assembly comprising a plurality of rows of pixel units;
a phase retarder on a light exit side of the display assembly, the phase retarder being configured to modulate polarized light from adjacent rows of pixel units of the display assembly so that it has different directions of rotation of polarization orientation;
a polarizer between the display assembly and the phase retarder; and
a visible range adjuster between the display assembly and the polarizer, the visible range adjuster having a first electrode layer, a second electrode layer and a liquid crystal layer, the liquid crystal layer being divided into at least one first region and at least one second region, an orthographic projection of the first region on the display assembly overlapping a portion between the adjacent rows of pixel units,
wherein the visible range adjuster is configured to apply a voltage to the first region of the liquid crystal layer through the first electrode layer and the second electrode layer in response to a first signal, to provide a first visible range for the display device, the first visible range being greater than a second visible range of the display device with the first electrode layer and the second electrode layer electrically de-energized, and
wherein the first region is configured such that a polarization orientation of an exit light of the display assembly transmitted through the first region is a first polarization orientation after the voltage is applied to the first region,
the second region is configured such that a polarization orientation of an exit light of the display assembly transmitted through the second region is a second polarization orientation, and
the polarizer is configured to transmit the polarized light having the second polarization orientation through the polarizer and to block the polarized light having the first polarization orientation.

2. A display device, comprising:
a display assembly comprising a plurality of rows of pixel units;
a phase retarder on a light exit side of the display assembly, the phase retarder being configured to modulate polarized light from adjacent rows of pixel units of the display assembly so that it has different directions of rotation of polarization orientation;
a polarizer between the display assembly and the phase retarder; and
a visible range adjuster between the display assembly and the polarizer, the visible range adjuster having a first electrode layer, a second electrode layer and a liquid crystal layer, the liquid crystal layer being divided into at least one first region and at least one second region, an orthographic projection of the first region on the display assembly overlapping a portion between the adjacent rows of pixel units,
wherein the visible range adjuster is configured to apply a voltage to the first region of the liquid crystal layer through the first electrode layer and the second electrode layer in response to a first signal, to provide a first visible range for the display device, the first visible range being greater than a second visible range of the display device with the first electrode layer and the second electrode layer electrically de-energized, and
wherein the exit light of the display assembly is the polarized light having a first polarization orientation,
the first region is configured to maintain the polarization orientation of the exit light in the first polarization orientation after the voltage is applied to the first region,
the second region is configured to change the polarization orientation of the exit light to a second polarization orientation, and
the polarizer is configured to transmit the polarized light having the second polarization orientation through the polarizer and to block the polarized light having the first polarization orientation.

3. The display device according to claim 1, wherein the first polarization orientation is perpendicular to the second polarization orientation.

4. The display device according to claim 1, wherein the first electrode layer comprises a plate-shaped first electrode or a plurality of strip-shaped first electrodes, and the second electrode layer comprises a plurality of strip-shaped second electrodes; and at least one of the plurality of strip-shaped second electrodes corresponds to the at least one first region.

5. The display device according to claim 4, wherein the visible range adjuster is configured such that each first region corresponds to at least three adjacent ones of the second electrodes.

6. The display device according to claim 1, wherein,
the portion between the adjacent rows of pixel units on the display assembly is a non-display region; and
a width of the first region is greater than or equal to a width of the non-display region.

7. The display device according to claim 1, wherein the first electrode layer and the second electrode layer are respectively located on two sides of the liquid crystal layer; or the first electrode layer and the second electrode layer are both located on a same side of the liquid crystal layer.

8. The display device according to claim 1, wherein the phase retarder is a patterned phase retardation film.

9. The display device according to claim 1, further comprising: a polarized glasses detector configured to detect number of pairs of polarized glasses in use.

10. The display device according to claim 9, wherein the polarized glasses detector is configured to transmit the first signal to the visible range adjuster when the number of the pairs of polarized glasses in use is greater than or equal to 2.

11. The display device according to claim 10, wherein the polarized glasses detector is configured to transmit a second signal to the visible range adjuster when the number of the pairs of polarized glasses in use is less than or equal to 1, and the visible range adjuster is further configured to stop electrically energizing the first electrode layer and the second electrode layer in response to the second signal.

12. The display device according to claim 10, wherein the visible range adjuster is configured to increase a width of the first region as the number of the detected pairs of polarized glasses increases.

13. The display device according to claim 10, further comprising a backlight adjuster, wherein the polarized glasses detector is configured to transmit a third signal to the backlight adjuster in response to the number of the pairs of polarized glasses in use being greater than or equal to 1 and to transmit a fourth signal to the backlight adjuster in response to the number of the pairs of polarized glasses in use being equal to 0, and the backlight adjuster is configured to be turned on to increase backlight intensity of the display assembly in response to the third signal and to be turned off in response to the fourth signal.

14. The display device according to claim 9, wherein the polarized glasses detector is configured to transmit a fifth signal to the phase retarder in response to the number of the pairs of polarized glasses in use being greater than or equal to 1 and to transmit a sixth signal to the phase retarder in response to the number of the pairs of polarized glasses being equal to 0, and the phase retarder is configured to be turned on to modulate the polarized light from adjacent rows of pixel units of the display assembly so that it has different directions of rotation of polarization orientation in response to the fifth signal and configured to be turned off to stop modulating the polarized light in response to the sixth signal.

15. A control method of the display device according to claim 1, comprising:
detecting number of pairs of polarized glasses in use; and
applying a voltage to the first region of the liquid crystal layer through the first electrode layer and the second electrode layer in the visible range adjuster to provide a first visible range for the display device in response to the number of the pairs of polarized glasses in use being greater than or equal to 2.

16. The control method according to claim 15, further comprising:
stopping electrically energizing the first electrode layer and the second electrode layer in the visible range adjuster to provide a second visible range for the display device in response to the number of the pairs of polarized glasses in use being less than or equal to 1.

17. The control method according to claim 15, further comprising increasing a width of the first region as the number of the detected pairs of polarized glasses increases.

18. The control method according to claim 15, further comprising:
increasing backlight intensity of the display assembly in response to the number of the pairs of polarized glasses in use being greater than or equal to 1.

19. A control method of the display device according to claim 1, wherein the display device comprises a backlight adjuster for increasing backlight intensity of the display assembly, the method comprising:
detecting the number of pairs of polarized glasses in use;
turning on the visible range adjuster, the phase retarder and the backlight adjuster in response to the number of the pairs of polarized glasses in use being greater than or equal to 2;
turning on the phase retarder and the backlight adjuster and turning off the visible range adjuster in response to the number of the pairs of polarized glasses in use being equal to 1; and
turning off the visible range adjuster, the phase retarder, and the backlight adjuster in response to the number of the pairs of polarized glasses in use being equal to 0.

* * * * *